(12) United States Patent
Va et al.

(10) Patent No.: US 10,802,110 B2
(45) Date of Patent: Oct. 13, 2020

(54) VEHICULAR RADAR INTERFERENCE MANAGEMENT USING BASIC SAFETY MESSAGES

(71) Applicant: TOYOTA JIDOSHA KABUSHIKI KAISHA, Toyota-shi, Aichi-ken (JP)

(72) Inventors: Vutha Va, Mountain View, CA (US); Takayuki Shimizu, Mountain View, CA (US); Gaurav Bansal, Mountain View, CA (US)

(*) Notice: Subject to any disclaimer, the term of this patent is extended or adjusted under 35 U.S.C. 154(b) by 206 days.

(21) Appl. No.: 15/717,727

(22) Filed: Sep. 27, 2017

(65) Prior Publication Data

US 2019/0094333 A1 Mar. 28, 2019

(51) Int. Cl.
*G01S 7/02* (2006.01)
*G01S 13/931* (2020.01)
*B60W 30/08* (2012.01)

(52) U.S. Cl.
CPC ............ *G01S 7/023* (2013.01); *G01S 13/931* (2013.01); *B60W 30/08* (2013.01); *B60W 2420/52* (2013.01); *G01S 2013/9316* (2020.01)

(58) Field of Classification Search
CPC ...... G01S 7/023; G01S 13/931; B60W 30/08; B60W 2420/52
USPC .......................................................... 342/70
See application file for complete search history.

(56) References Cited

U.S. PATENT DOCUMENTS

| 9,355,561 | B2 | 5/2016 | Rubin et al. |
| 9,449,515 | B2 | 9/2016 | Rubin et al. |
| 2008/0106458 | A1* | 5/2008 | Honda ............... G01S 13/34 342/59 |
| 2016/0061935 | A1* | 3/2016 | McCloskey ......... G01S 7/023 342/82 |

FOREIGN PATENT DOCUMENTS

JP PO2009-133875 6/2009

* cited by examiner

*Primary Examiner* — Erin F Heard
*Assistant Examiner* — Michael W Justice
(74) *Attorney, Agent, or Firm* — Burbage Law, P.C.; Jon-Michael Burbage; Elizabeth Ruzich

(57) ABSTRACT

The disclosure includes embodiments for minimizing radar interference. In some embodiments, a method includes observing, for a time frame, an order in which Basic Safety Messages ("BSMs") are received by a DSRC radio of the ego vehicle and broadcasted by the DSRC radio of the ego vehicle. In some embodiments, the method includes building a data structure that includes digital data that describes the order in which the BSMs were received and transmitted by the DSRC radio during the time frame. In some embodiments, the method includes assigning, by the onboard computer of the ego vehicle, radar parameters to the one or more other DSRC-enabled vehicles and the ego vehicle based on the order described by the digital data included in the data structure.

20 Claims, 7 Drawing Sheets

500

Time synchronized among DSRC-enabled vehicles based on
time data received from GPS

600

700

Observe, for a time frame, an order in which BSMs are received by a DSRC radio of an ego vehicle and broadcasted by the DSRC radio of the ego vehicle, wherein the BSMs are transmitted by one or more other DSRC-enabled vehicles that share a protocol with the ego vehicle so that the one or more other DSRC-enabled vehicles and the ego vehicle obey the protocol and wherein the ego vehicle and the one or more other DSRC-enabled vehicles each include an onboard radar system 702

Build a data structure that includes digital data that describes the order in which the DSRC messages were received and broadcasted by the DSRC radio during the time frame 704

Assign, by an onboard computer of the ego vehicle, radar parameters to the one or more other DSRC-enabled vehicles and the ego vehicle based on the order described by the digital data included in the data structure, wherein the protocol describes how the order is determined and the radar parameters are assigned so that the ego vehicle and the one or more other DSRC-enabled vehicles assign same radar parameters without transmitting wireless messages to confirm the digital data with each other and wherein the ego vehicle and the one or more other DSRC-enabled vehicles, during the time frame, each execute their respective onboard radar systems based on the radar parameters that are operable to control the execution of the respective onboard radar systems so that they minimize radar interference among the respective onboard radar systems of the ego vehicle and the one or more other DSRC-enabled vehicles 706

Figure 7

VEHICULAR RADAR INTERFERENCE MANAGEMENT USING BASIC SAFETY MESSAGES

BACKGROUND

The specification relates to minimizing radar interference in Dedicated Short Range Communication (DSRC)-enabled vehicles.

Modern vehicles include many different Advanced Driver Assistance Systems ("ADAS system" if singular, "ADAS systems" if plural). These ADAS systems rely heavily on the vehicle's onboard radar system to provide environment sensing information that is necessary for these ADAS systems to provide their functionality. As a result, there are many different vehicles on the roadway at any given time that are clustered together and executing their onboard radar systems simultaneously, thereby resulting in radar interference. This radar interference causes the environmental sensing information recorded by these onboard radar systems to be inaccurate and unusable, thereby rendering the ADAS systems of these vehicles to be non-functional. The radar interference may even cause the ADAS systems to identify ghost objects that do not exist, which can make the ADAS systems dangerous depending on how the ghost objects are treated by the ADAS systems.

SUMMARY

Described herein is a method for minimizing radar interference. The method is implemented by an onboard vehicle computer of an ego vehicle that is DSRC-enabled. The method may include observing, for a time frame, an order in which Basic Safety Messages ("BSMs") are received by a DSRC radio of the ego vehicle and broadcasted by the DSRC radio of the ego vehicle, wherein the BSMs are transmitted by one or more other DSRC-enabled vehicles that share a protocol with the ego vehicle so that the one or more other DSRC-enabled vehicles and the ego vehicle obey the protocol and wherein the ego vehicle and the one or more other DSRC-enabled vehicles each include an onboard radar system. The method may further include building a data structure that includes digital data that describes the order in which the BSMs were received and transmitted by the DSRC radio during the time frame. The method may further include assigning, by the onboard computer of the ego vehicle, radar parameters to the one or more other DSRC-enabled vehicles and the ego vehicle based on the order described by the digital data included in the data structure, wherein the protocol describes how the order is determined and the radar parameters are assigned so that the ego vehicle and the one or more other DSRC-enabled vehicles assign same radar parameters without transmitting wireless messages to confirm the digital data with each other.

In some embodiments, the ego vehicle and the one or more other DSRC-enabled vehicles, during the time frame, each execute their respective onboard radar systems based on the radar parameters, which are operable to control the execution of the onboard radar systems so that they minimize radar interference among the onboard radar systems of the ego vehicle and the one or more other DSRC-enabled vehicles. In some embodiments, the method may further include updating the data structure to include the radar parameters. In some embodiments, the ego vehicle and the DSRC-enabled vehicles are located within a same geographic region that is limited to a broadcast range of the BSMs. In some embodiments, the BSMs are broadcast at a bandwidth between 5.850 and 5.925 gigahertz. In some embodiments, the order is an initial order, the time frame is an initial time frame, and the method further comprises: responsive to a period of time for the initial time frame expiring, setting the radar parameters to null, observing a subsequent order in which the BSMs are received by the DSRC radio of the ego vehicle and broadcasted by the DSRC radio of the ego vehicle during a subsequent time frame, updating the digital data in the data structure to include the subsequent order in which the DSRC messages were received and broadcasted by the DSRC radio, and assigning the radar parameters to the one or more other DSRC-enabled vehicles and the ego vehicle based on the subsequent order described by the digital data included in the data structure. In some embodiments, the radar parameters include communication channels and assigning the radar parameters to the one or more other DSRC-enabled vehicles and the ego vehicle is further based on: determining that the communication channels have been assigned to the one or more other DSRC-enabled vehicles, determining a position of each of the one or more other DSRC-enabled vehicles based on position data included in the BSMs, and assigning a communication channel from the communication channels to the ego vehicle that is different from the communication channels that are assigned to the one or more other DSRC-enabled vehicles that are positioned next to the ego vehicle. In some embodiments, the ego vehicle and the one or more other DSRC-enabled vehicles each include a corresponding advanced driver assistance system. In some embodiments, the ego vehicle and the one or more other DSRC-enabled vehicles share a synchronized time that is based on data received from a global positioning system satellite. In some embodiments, the ego vehicle and the one or more other DSRC-enabled vehicles chose a same backoff channel, the order is an initial order, the time frame is an initial time frame, and the method further comprises: determining, by the ego vehicle, that a packet from the one or more other DSRC-enabled vehicles is longer than expected, responsive to a period of time for the initial time frame expiring, setting the radar parameters to null, observing a subsequent order in which the BSMs are received by the DSRC radio of the ego vehicle and broadcasted by the DSRC radio of the ego vehicle during a subsequent time frame, and assigning the radar parameters to the one or more other DSRC-enabled vehicles and the ego vehicle based on the subsequent order.

A system can comprise an onboard vehicle computer of an ego vehicle that is Dedicated Short Range Communication-enabled ("DSRC-enabled") and that includes a non-transitory memory storing computer code, which, when executed by the onboard vehicle computer system causes the onboard vehicle computer system to: observe, for a time frame, an order in which Basic Safety Messages ("BSMs") are received by a DSRC radio of the ego vehicle and broadcasted by the DSRC radio of the ego vehicle, wherein the BSMs are transmitted by one or more other DSRC-enabled vehicles that share a protocol with the ego vehicle so that the one or more other DSRC-enabled vehicles and the ego vehicle obey the protocol and wherein the ego vehicle and the one or more other DSRC-enabled vehicles each include an onboard radar system. The computer code further causes the onboard vehicle computer system to build a data structure that includes digital data that describes the order in which the BSMs were received and transmitted by the DSRC radio during the time frame. The computer code further causes the onboard vehicle computer system to assign radar parameters to the one or more other DSRC-enabled vehicles and the ego vehicle based on the order described by the digital data included in the data structure, wherein the protocol describes how the order is determined and the radar parameters are assigned so that the ego vehicle and the one or more other DSRC-enabled vehicles assign same radar parameters without transmitting wireless messages to confirm the digital data with each other.

In some embodiments, the ego vehicle and the one or more other DSRC-enabled vehicles, during the time frame, each execute their respective onboard radar systems based on the radar parameters, which are operable to control execution of the respective onboard radar systems so that they minimize radar interference among the respective onboard radar systems of the ego vehicle and the one or more other DSRC-enabled vehicles. In some embodiments, the computer code further causes the onboard vehicle computer system to update the data structure to include the radar parameters. In some embodiments, the ego vehicle and the DSRC-enabled vehicles are located within a same geographic region that is limited to a broadcast range of the BSMs. In some embodiments, the BSMs are broadcast at a bandwidth between 5.850 and 5.925 gigahertz. In some embodiments, the order is an initial order, the time frame is an initial time frame, and the computer code further causes the onboard vehicle computer system to, responsive to a period of time for the initial time frame expiring, setting the radar parameters to null, observing a subsequent order in which the BSMs are received by the DSRC radio of the ego vehicle and broadcasted by the DSRC radio of the ego vehicle during a subsequent time frame, update the digital data in the data structure to include the subsequent order in which the DSRC messages were received and broadcasted by the DSRC radio, and assign the radar parameters to the one or more other DSRC-enabled vehicles and the ego vehicle based on the subsequent order described by the digital data included in the data structure. In some embodiments, the radar parameters include communication channels and assigning the radar parameters to the one or more other DSRC-enabled vehicles and the ego vehicle is further based on: determining that the communication channels have been assigned to the one or more other DSRC-enabled vehicles and the ego vehicle and assigning a communication channels from the communication channels to a neighboring DSRC-enabled vehicle that is different from the communication channels that are assigned to the one or more other DSRC-enabled vehicles that are positioned next to the neighboring DSRC-enabled vehicle. In some embodiments, the ego vehicle and the one or more other DSRC-enabled vehicles each include a corresponding advanced driver assistance system. In some embodiments, the ego vehicle and the one or more other DSRC-enabled vehicles share a synchronized time that is based on data received from a global positioning system satellite. In some embodiments, the ego vehicle and the one or more other DSRC-enabled vehicles chose a same backoff channel, the order is an initial order, the time frame is an initial time frame, and the computer code further causes the onboard vehicle computer system to determine, by the ego vehicle, that a packet from the one or more other DSRC-enabled vehicles is longer than expected, responsive to a period of time for the initial time frame expiring, set the radar parameters to null, observe a subsequent order in which the BSMs are received by the DSRC radio of the ego vehicle and broadcasted by the DSRC radio of the ego vehicle during a subsequent time frame, and assign the radar parameters to the one or more other DSRC-enabled vehicles and the ego vehicle based on a subsequent order described by the digital data included in the data structure.

One general aspect includes a non-transitory memory encoded with a computer program, the computer program comprising instructions that, when executed by one or more processors, cause the one or more processors to perform operations comprising observing, for a time frame, an order in which Basic Safety Messages ("BSMs") are received by a Dedicated Short Range Communication ("DSRC") radio of the ego vehicle and broadcasted by the DSRC radio of the ego vehicle, wherein the BSMs are transmitted by one or more other DSRC-enabled vehicles that share a protocol with the ego vehicle so that the one or more other DSRC-enabled vehicles and the ego vehicle obey the protocol and wherein the ego vehicle and the one or more other DSRC-enabled vehicles each include an onboard radar system. The operations further include building a data structure that includes digital data that describes the order in which the BSMs were received and transmitted by the DSRC radio during the time frame. The operations further include assigning radar parameters to the one or more other DSRC-enabled vehicles and the ego vehicle based on the order described by the digital data included in the data structure, wherein the protocol describes how the order is determined and the radar parameters are assigned so that the ego vehicle and the one or more other DSRC-enabled vehicles assign same radar parameters without transmitting wireless messages to confirm the digital data with each other.

In some embodiments, the ego vehicle and the one or more other DSRC-enabled vehicles, during the time frame, each execute their respective onboard radar systems based on the radar parameters which are operable to control execution of the respective onboard radar systems so that they minimize radar interference among the respective onboard radar systems of the ego vehicle and the one or more other DSRC-enabled vehicles. In some embodiments, the operations may further include updating the data structure to include the radar parameters. In some embodiments, the ego vehicle and the DSRC-enabled vehicles are located within a same geographic region that is limited to a broadcast range of the BSMs. In some embodiments, the BSMs are broadcast at a bandwidth between 5.850 and 5.925 gigahertz. In some embodiments, the order is an initial order, the time frame is an initial time frame, and the operations further include, responsive to a period of time for the initial time frame expiring, setting the radar parameters to null, observing a subsequent order in which the BSMs are received by the DSRC radio of the ego vehicle and broadcasted by the DSRC radio of the ego vehicle during a subsequent time frame, updating the digital data in the data structure to include the subsequent order in which the DSRC messages were received and broadcasted by the DSRC radio, and assigning the radar parameters to the one or more other DSRC-enabled vehicles and the ego vehicle based on the subsequent order described by the digital data included in the data structure. In some embodiments, the radar parameters include communication channels and assigning the radar parameters to the one or more other DSRC-enabled vehicles and the ego vehicle is further based on: determining that the communication channels have been assigned to the one or more other DSRC-enabled vehicles and the ego vehicle and assigning a communication channels from the communication channels to a neighboring DSRC-enabled vehicle that is different from the communication channels that are assigned to the one or more other DSRC-enabled vehicles that are positioned next to the neighboring DSRC-enabled vehicle. In some embodiments, the ego vehicle and the one or more other DSRC-enabled vehicles each include a corresponding advanced driver assistance system. In some embodiments, the ego vehicle and the one or more other DSRC-enabled vehicles share a synchronized time that is based on data received from a global positioning system satellite. In some embodiments, the ego vehicle and the one or more other DSRC-enabled vehicles chose a same backoff channel, the order is an initial order, the time frame is an initial time frame, and the operations further comprise: determining, by the ego vehicle, that a packet from the one or more other DSRC-enabled vehicles is longer than expected, responsive to a period of time for the initial time frame expiring, setting the radar parameters to null, observing a subsequent order in which the BSMs are received by the DSRC radio of the ego vehicle and broadcasted by the DSRC radio of the ego vehicle during a subsequent time frame, and assigning the radar parameters to the one or more other DSRC-enabled vehicles and the ego vehicle based on a subsequent order described by the digital data included in the data structure.

The specification describes a radar interference management system that solves the problem of radar interference by using BSMs to assign radar parameters in a distributed in non-centralized fashion. In addition to this advantage and improvement, the specification also describes the following additional advantages and improvements which are not present in existing solutions: (1) no reliance on a central scheduler, which would delay transmissions; (2) no extra overhead besides generating the basic safety messages (i.e., no handshaking is needed); (3) reliable packet transmissions in dense traffic; and (4) application to different types of radars or different types of sensors. The radar interference management system may be particularly advantageous for vehicles that are DSRC-enabled vehicles, vehicles that include ADAS systems, and vehicles that communicate using BSMs.

BRIEF DESCRIPTION OF THE DRAWINGS

The disclosure is illustrated by way of example, and not by way of limitation in the figures of the accompanying drawings in which like reference numerals are used to refer to similar elements.

FIG. 7 is a flowchart of an example method for minimizing radar interference according to some embodiments.

DETAILED DESCRIPTION

Figure 1A:
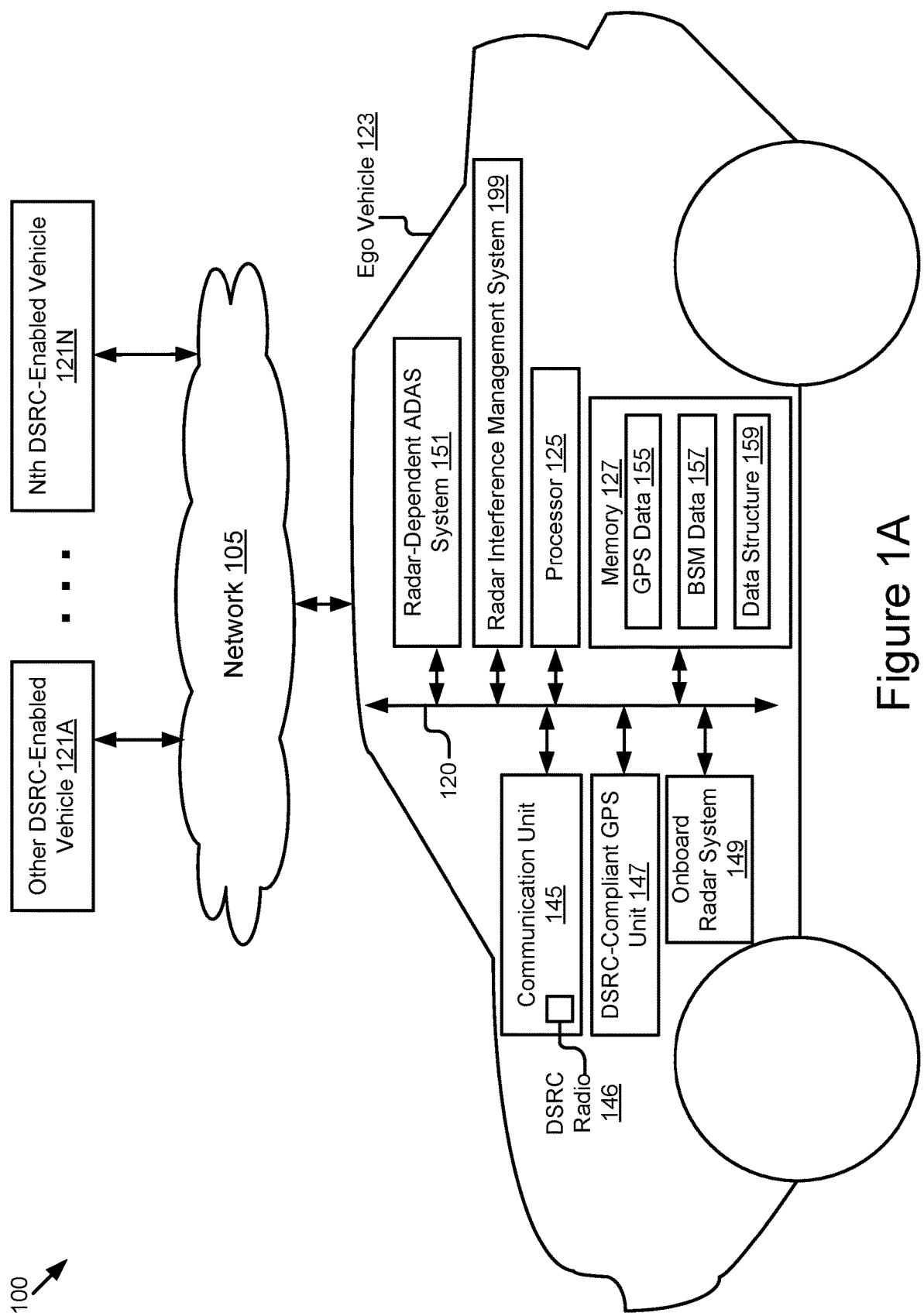
FIG. 1A is a block diagram illustrating an operating environment for a radar interference management system according to some embodiments.

A DSRC-enabled vehicle is a vehicle which includes a DSRC radio and is operable to lawfully send and receive DSRC messages in a jurisdiction where the DSRC-enabled vehicle is located. A DSRC-enabled vehicle may also be referred to as a DSRC-equipped vehicle. A DSRC radio is hardware that includes a DSRC receiver and a DSRC transmitter, and is operable to wirelessly send and receive DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States and Europe, DSRC messages are transmitted at 5.9 GHz. In the United States, DSRC messages are allocated 75 MHz of spectrum in the 5.9 GHz band. In Europe, DSRC messages are allocated 30 MHz of spectrum in the 5.9 GHz band. In Japan, DSRC messages are transmitted in the 760 MHz band with 10 MHz of spectrum. A wireless message, therefore, is not a DSRC message unless it operates in the 5.9 GHz band in the United States and Europe or the 760 MHz band in Japan. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz.

In some embodiments, a DSRC-enabled vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a vehicle lane is generally about 3.7 meters wide, and an accuracy of plus or minus 1.5 meters is sufficient to identify which lane a vehicle is travelling in among other vehicle lanes. In some embodiments, a DSRC-compliant GPS unit is operable to identify, monitor and track its two-dimensional position within 1.5 meters of its actual position 68% of the time under an open sky.

The DSRC messages are communicated using a vehicular-adapted wireless messaging protocol. One type of DSRC message is known as a Basic Safety Message ("BSM" if singular or "BSMs" if plural). The BSM may be broadcast at a bandwidth between 5.850 and 5.925 gigahertz. The transmission range of the BSM may be as large as 1,000 meters. DSRC-enabled vehicles broadcast a BSM at a regular interval, which is referred to below as a "time frame." In some embodiments, a radar interference management system is programmed with a default time frame value, for example, 0.01 seconds. The time frame may be user adjustable. In some embodiments, the BSM is broadcast at an adjustable rate of once every 0.10 seconds.

A BSM includes BSM data. The BSM data describes attributes of the vehicle. For example, the BSM may include two parts. Part 1 contains core data elements and is transmitted at an adjustable rate of about 10 times per second. Part 1 of the BSM data may describe one or more of the following: (1) GPS data describing a position of the vehicle; (2) motion data for the vehicle; and (3) a path history of the vehicle. The position of the vehicle may include latitude, longitude, elevation, positional accuracy, and a time associated with the position. The motion of the vehicle may include a transmission state, a speed of the vehicle, a heading of the vehicle, a steering wheel angle of the vehicle, a four-way acceleration set for the vehicle that includes three axes of acceleration plus yaw rate, and a brake system status. In some embodiments, part 1 may also include vehicle size.

Part 2 of the BSM data may include a variable set of data elements drawn from a list of optional elements. The list of optional elements may include a path history, a path prediction, information about hard active braking, information about a traction control system when it is active over 100 msec, information about an antilock brake system when it is active over 100 msec, a status of lights that are changed, a status of exterior lights, information about a change of the wipers, a status of the wipers, and vehicle type. Some of the BSM data included in Part 2 of the BSM are selected based on event triggers, e.g., anti-locking brake system ("ABS") being activated may trigger BSM data relevant to the ABS system of the vehicle. In some embodiments, the selected data elements are added to part 1 and sent as part of the BSM, but are transmitted less frequently in order to conserve bandwidth. In some embodiments, part 2 also includes current snapshots, with the exception of path data, which is itself limited to a few seconds worth of past history data.

Example System

Referring to FIG. 1A, is an operating environment 100 for a radar interference management system 199 according to some embodiments. As depicted, the operating environment 100 includes the following elements: an ego vehicle 123, an other DSRC-enabled vehicle 121A, and an nth DSRC-enabled vehicle 121N. These elements are communicatively coupled to one another by a network 105.

In FIG. 1A and the remaining figures, a letter after a reference number, e.g., "121A," represents a reference to the element having that particular reference number. A reference number in the text without a following letter, e.g., "121," represents a general reference to embodiments of the element bearing that reference number.

Although one ego vehicle 123, one other DSRC-enabled vehicle 121A, one nth DSRC-enabled vehicle 121N, and one network 105 are depicted in FIG. 1, in practice the operating environment 100 may include one or more ego vehicles 123, one or more other DSRC-enabled vehicle 121A, one or more nth DSRC-enabled vehicle 121N, and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

The ego vehicle 123, the other DSRC-enabled vehicle 121A, and the nth DSRC-enabled vehicle 121N are DSRC-enabled vehicles that each include a DSRC radio. The network 105 may include a DSRC communication channel shared among the ego vehicle 123, the other DSRC-enabled vehicle 121A, and the nth DSRC-enabled vehicle 121N. In some embodiments, the ego vehicle 123, the other DSRC-enabled vehicle 121A, and the nth DSRC-enabled vehicle 121N communicate using BSMs. One or more of the ego vehicle 123, the other DSRC-enabled vehicle 121A, and the nth DSRC-enabled vehicle 121N include an onboard radar system.

In some embodiments, one or more of the ego vehicle 123, the other DSRC-enabled vehicle 121A, and the nth DSRC-enabled vehicle 121N is an autonomous vehicle or a semi-autonomous vehicle. For example, the ego vehicle 123 includes a set of Advanced Driver Assistance Systems (a set of "ADAS systems") that provide autonomous features to the ego vehicle 123 which are sufficient to render the ego vehicle 123 an autonomous vehicle.

The National Highway Traffic Safety Administration ("NHTSA") has defined different "levels" of autonomous vehicles, e.g., Level 0, Level 1, Level 2, Level 3, Level 4, and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower-level number. The different levels of autonomous vehicles are described briefly below.

Level 0: The set of ADAS systems installed in a vehicle have no vehicle control, but may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the autonomous vehicle fail to respond properly (based on the driver's subjective judgement). The set of ADAS systems installed in the autonomous vehicle executes accelerating, braking, and steering. The set of ADAS systems installed in the autonomous vehicle can deactivate immediately upon takeover by the driver.

Level 3: Within known, limited environments (such as freeways), the driver can safely turn their attention away from driving tasks, but must still be prepared to take control of the autonomous vehicle when needed. A highly autonomous vehicle ("HAV") is an autonomous vehicle that is Level 3 or higher.

Level 4: The set of ADAS systems installed in the autonomous vehicle can control the autonomous vehicle in all but a few environments such as severe weather. The driver must enable the automated system (which is comprised of the set of ADAS systems installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

Accordingly, in some embodiments one or more of the ego vehicle 123, the other DSRC-enabled vehicle 121A, and the nth DSRC-enabled vehicle 121N is one of the following: a Level 1 autonomous vehicle; a Level 2 autonomous vehicle; a Level 3 autonomous vehicle; a Level 4 autonomous vehicle; a Level 5 autonomous vehicle; and an HAV.

The ego vehicle 123 is any type of vehicle with an onboard vehicle computer that is DSRC enabled. For example, the ego vehicle 123 is one of the following types of vehicles: a car; a truck; a sports utility vehicle; a bus; a semi-truck; a drone; or any other roadway-based conveyance.

In some embodiments, the ego vehicle 123 includes the following elements: a processor 125; a memory 127; a communication unit 145 including a DSRC radio 146; a DSRC-compliant GPS unit 147; an onboard radar system 149; a radar-dependent ADAS system 151; and the radar interference management system 199. Each of the elements communicate via a bus 120.

In some embodiments, the processor 125 and the memory 127 may be elements of the onboard vehicle computer system (such as the computer system 200 described below with reference to FIG. 2). The onboard vehicle computer system may be operable to cause or control the operation of the radar interference management system 199. The onboard vehicle computer system may be operable to access and execute the data stored on the memory 127 to provide the functionality described herein for the radar interference management system 199 or its elements (see, e.g., FIG. 2). The onboard vehicle computer system may be operable to execute the radar interference management system 199, which causes the onboard vehicle computer system to execute one or more of the steps of the method 700 described below with reference to FIG. 7.

In some embodiments, the processor 125 and the memory 127 may be elements of an onboard unit. The onboard unit includes an electronic control unit (herein "ECU") or an onboard vehicle computer system that may be operable to cause or control the operation of the radar interference management system 199. The onboard unit may be operable to access and execute the data stored on the memory 127 to provide the functionality described herein for the radar interference management system 199 or its elements. The onboard unit may be operable to execute the radar interference management system 199 which causes the onboard unit to execute one or more of the steps of the method 700 described below with reference to FIG. 7. In some embodiments, the computer system 200 depicted in FIG. 2 is an example of an onboard unit.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 is a non-transitory memory that stores instructions or data that may accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The ego vehicle 123 may include one or more memories 127.

The memory 127 of the ego vehicle 123 stores one or more of the following types of digital data: GPS data 155; data structure 159; and BSM data 157. In some embodiments, the memory 127 stores any data that is necessary for the radar interference management system 199 to provide its functionality.

The GPS data 155 is digital data that describes a geographic location of an object. In some embodiments, the GPS data 155 describes the geographic location of the object with lane-level precision.

In some embodiments, the memory 127 stores one or more instances of the GPS data 155. For example, the memory 127 stores: a first instance of GPS data 155 that describes the geographic location of the ego vehicle 123 and a second instance of GPS data 155 that describes the geographic location of the DSRC-equipped electronic device that transmitted the BSM message, which included the BSM data 157 (e.g., the nth DSRC-enabled vehicle 121N). The first instance of GPS data 155 is retrieved by the DSRC-compliant GPS unit 147 of the ego vehicle 123. The second instance of GPS data 155 is retrieved by a DSRC-compliant GPS unit of the DSRC-equipped electronic device that broadcasted the BSM message which included the BSM data 157 (e.g., the nth DSRC-enabled vehicle 121N).

In some embodiments, the GPS data 155 includes time data. Each transmission between the DSRC-compliant GPS unit 147 and the GPS satellite may include time data that describes the time as understood by a GPS satellite. The ego vehicle 123 may synchronize its onboard computer time with the other DSRC-enabled vehicle 121A and the nth DSRC-enabled vehicle 121N based on the time data received from the DSRC-compliant GPS unit 147. The radar interference management system 199 of the ego vehicle 123, the other DSRC-enabled vehicle 121A, and the nth DSRC-enabled vehicle 121N use the time data to synchronize the time in order to generate the same time frames in each respective DSRC-enabled vehicle 121.

The BSM data 157 is digital data that is received in a BSM message. In some embodiments, the memory 127 stores DSRC data that is digital data received in a DSRC message. The DSRC data describes any information that is included in the BSM data 157. For example, a BSM message is a special type of DSRC message that is broadcasted at a regular interval (e.g., once every 0.10 seconds), but the content or payload of a DSRC message (i.e., the DSRC data) is the same as that of a BSM message (i.e., the DSRC data for a DSRC message is the same as or similar to the BSM data for a BSM message).

In some embodiments, the BSM data 157 is received by the ego vehicle 123 in a BSM message that is broadcasted by one or more of the other DSRC-enabled vehicle 121A and the nth DSRC-enabled vehicle 121N. This broadcast may occur at regular intervals.

In some embodiments, the BSM data 157 includes one or more of the following: (1) GPS data 155 for the DSRC-equipped electronic device that broadcasted the BSM message that included the BSM data 157 (e.g., the other DSRC-enabled vehicle 121A); and (2) a received vehicle identifier for the DSRC-equipped electronic device that broadcasted the BSM message, which included the BSM data 157 (e.g., the other DSRC-enabled vehicle 121A). The GPS data 155 included in the BSM data 157 describes the geographical location of the vehicle (e.g., the other DSRC-enabled vehicle 121A) that broadcasted the BSM message which included the BSM data 157. The received vehicle ID may be digital data that describes a unique identifier of the vehicle (e.g., the other DSRC-enabled vehicle 121A) that broadcasted the BSM message which included the BSM data 157.

The data structure 159 describes an order in which BSMs were received and broadcasted by the DSRC radio 146 of the ego vehicle 123 during the time frame. The data structure 159 may be a table. The data structure 159 may include digital data about how the time frame has been defined (e.g., the time frame value is 0.01 seconds), whether the time frame has been user modified, etc. The data structure 159 may also include digital data about the radar parameters being used by the DSRC-enabled vehicles based on the order in which the BSMs were received and broadcasted.

The data structure 159 may be updated with digital data as the time frame expires and BMS are received and broadcasted for a subsequent time frame. For example, the data structure 159 may include, digital data that describes an initial order in which the BSMs were received and broadcasted by the DSRC radio 146 during an initial time frame. The data structure 159 may then be updated with digital data that describes a subsequent order in which the BSMs were received and broadcasted by the DSRC radio 146 during a subsequent time frame.

The communication unit 145 transmits and receives data to and from the network 105 or to another communication channel. In some embodiments, the communication unit 145 may include a DSRC transceiver, a DSRC receiver and other hardware or software necessary to make the ego vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, Bluetooth®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a DSRC radio 146. The DSRC radio 146 is a hardware unit that includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band.

In some embodiments, the DSRC radio 146 includes a non-transitory memory, which stores digital data that controls the frequency for broadcasting BSM messages. In some embodiments, the non-transitory memory stores a buffered version of the GPS data 155 for the ego vehicle 123 so that the GPS data 155 for the ego vehicle 123 is broadcast as an element of the BSM messages, which are regularly broadcast by the DSRC radio 146.

In some embodiments, the DSRC radio 146 includes any hardware or software which is necessary to make the ego vehicle 123 compliant with the DSRC standards. In some embodiments, the DSRC-compliant GPS unit 147 is an element of the DSRC radio 146.

In some embodiments, the DSRC radio 146 includes a non-transitory memory which stores digital data that controls the frequency for broadcasting BSM messages. In some embodiments, the non-transitory memory stores a buffered version of the GPS data 155 discussed below for the ego vehicle 123 so that the GPS data 155 for the ego vehicle 123 is broadcast as an element of the BSM messages which are regularly broadcast by the DSRC radio 146.

In some embodiments, the DSRC radio 146 includes any hardware or software which is necessary to make the ego vehicle 123 compliant with the DSRC standards. In some embodiments, the DSRC-compliant GPS unit 147 is an element of the DSRC radio 146.

In some embodiments, the DSRC-compliant GPS unit 147 includes any hardware and software necessary to make the ego vehicle 123 or the DSRC-compliant GPS unit 147 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 147 is operable to provide GPS data 155 describing the location of the ego vehicle 123 with lane-level accuracy. For example, the ego vehicle 123 is driving on a four-lane highway. Lane-level accuracy means that the location of the ego vehicle 123 is described by the GPS data 155 so accurately that the ego vehicle's 123 position in the third of the four lanes may be accurately determined based on the GPS data 155 for this ego vehicle 123 as provided by the DSRC-compliant GPS unit 147.

In some embodiments, the DSRC-compliant GPS unit 147 includes hardware that wirelessly communicates with a GPS satellite to retrieve GPS data 155 that describes the geographic location of the ego vehicle 123 with a precision that is compliant with the DSRC standard. The DSRC standard requires that GPS data 155 be precise enough to infer if two vehicles (one of which is, for example, the ego vehicle 123) are located in adjacent lanes. In some embodiments, the DSRC-compliant GPS unit 147 is operable to identify, monitor and track its two-dimensional position within 1.5 meters of its actual position 68% of the time under an open sky. Since traffic lanes are typically 3.7 meters wide, whenever the two-dimensional error of the GPS data 155 is less than 1.5 meters the radar interference management system 199 described herein may analyze the GPS data 155 provided by the DSRC-compliant GPS unit 147 and determine what lane the ego vehicle 123 is travelling in based on the relative positions of two or more travelling vehicles (one of which is, for example, the ego vehicle 123) in multiple lanes at the same time.

In some embodiments, the onboard radar system 149 includes any hardware and software necessary measure the physical environment outside of the ego vehicle 123. The onboard radar system 149 may include a sensor set of one or more sensors. For example, the sensor set may include one or more sensors that record one or more physical characteristics of the physical environment that is proximate to the ego vehicle 123. The memory 127 may store sensor data that describes the one or more physical characteristics recorded by the sensor set. The sensor data may be used by the radar interference management system 199 to confirm or deny the GPS data 155 or other data stored in the memory 127. For example, the GPS data 155 may indicate that the ego vehicle 123 is located near a particular landmark, and the sensor data may include a digital image that includes the particular landmark, thereby confirming the accuracy of the GPS data 155.

Figure 3A:
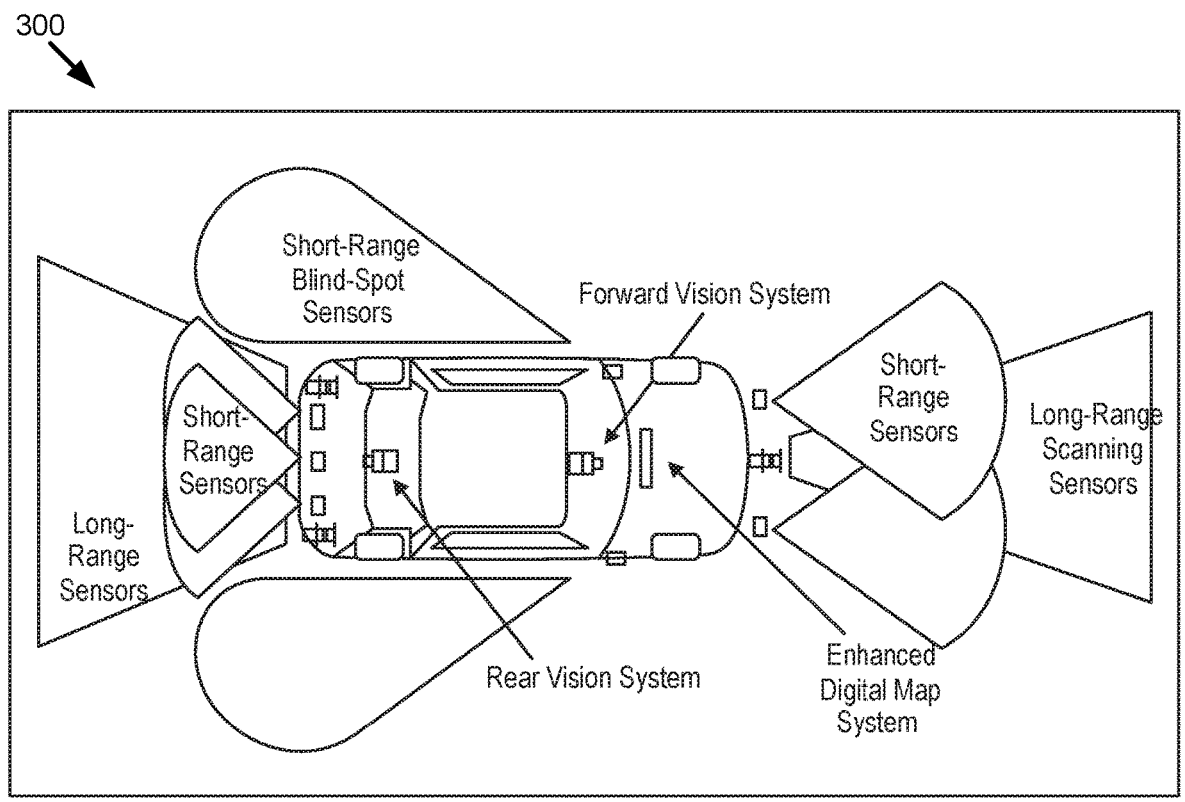
FIG. 3A is a block diagram illustrating an example sensor set used by the onboard radar system of FIG. 1A according to some embodiments.

The sensor set may include short-range sensors, long-range sensors, and other sensors that are described in greater detail below with reference to FIG. 3A. In some embodiments, the sensor set of the ego vehicle 123 may include one or more of the following vehicle sensors: a camera; a LIDAR sensor; an ultrasonic sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The radar-dependent ADAS system 151 includes software and hardware for assisting drivers. The radar-dependent ADAS system 151 includes one or more ADAS systems. Examples of ADAS systems included in the radar-dependent ADAS system 151 include one or more of the following elements of the HAV: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system. Each of these example ADAS systems provide their own features and functionality that may be referred to herein as a "ADAS feature" or an "ADAS functionality," respectively. The features and functionality provided by these example ADAS systems are also referred to herein as an "autonomous feature" or an "autonomous functionality," respectively. The autonomous features and autonomous functionality provided by the ADAS systems of the radar-dependent ADAS system 151 are sufficient to classify the vehicle which includes the optimization system 199 as an HAV. Specific examples of different ADAS systems are discussed below with reference to FIG. 3B.

In some embodiments, the radar interference management system 199 includes code and routines that are operable, when executed by the processor 125, to cause the processor 125 to execute one or more of the steps of the method 700 described below with reference to FIG. 7. In some embodiments, the radar interference management system 199 includes code and routines that are operable, when executed by the processor 125, to cause the processor 125 to execute one or more of the steps of the method 700 described below with reference to FIG. 7.

In some embodiments, the radar interference management system 199 of the ego vehicle 123 may be implemented using hardware including a field-programmable gate array ("FPGA") or an application-specific integrated circuit ("ASIC"). In some other embodiments, the radar interference management system 199 may be implemented using a combination of hardware and software.

The other DSRC-enabled vehicle 121A and the nth DSRC-enabled vehicle 121N may also include radar interference management systems (not shown). Each radar interference management system 199 may receive BSMs from the other DSRC-enabled vehicles 121A . . . 121N and the ego vehicle 123 and independently build a data structure that includes digital data that describes the order in which the BSMs were received and broadcasted by a respective DSRC radio during a time frame. Each radar interference management system 199 assigns radar parameters to the ego vehicle 123, the other DSRC-enabled vehicle 121A, and the nth DSRC-enabled vehicle 121N based on the order described by the digital data included in the data structure. As a result, when each of the ego vehicle 123, the other DSRC-enabled vehicle 121A, and the nth DSRC-enabled vehicle 121N execute their respective onboard radar systems, they use mutually agreed upon radar parameters to control the execution of the onboard radar systems so that they minimize radar interference among the onboard radar systems of the ego vehicle 123, the other DSRC-enabled vehicle 121A, and the nth DSRC-enabled vehicle 121N. In some embodiments, the radar interference management system 199 uses a vehicular-adapted wireless messaging protocol other than BSMs, such as LTE-V2X to manage when different vehicles execute their onboard radar systems so that radar interference among the ego vehicle 123, the other DSRC-enabled vehicle 121A, and the nth DSRC-enabled vehicle 121N is mitigated.

Embodiments of the radar interference management system 199 are described in more detail below with reference to FIGS. 2, 3A, 3B, 4A, 4B, 5, 6, and 7.

Example Use Case

Figure 1B:
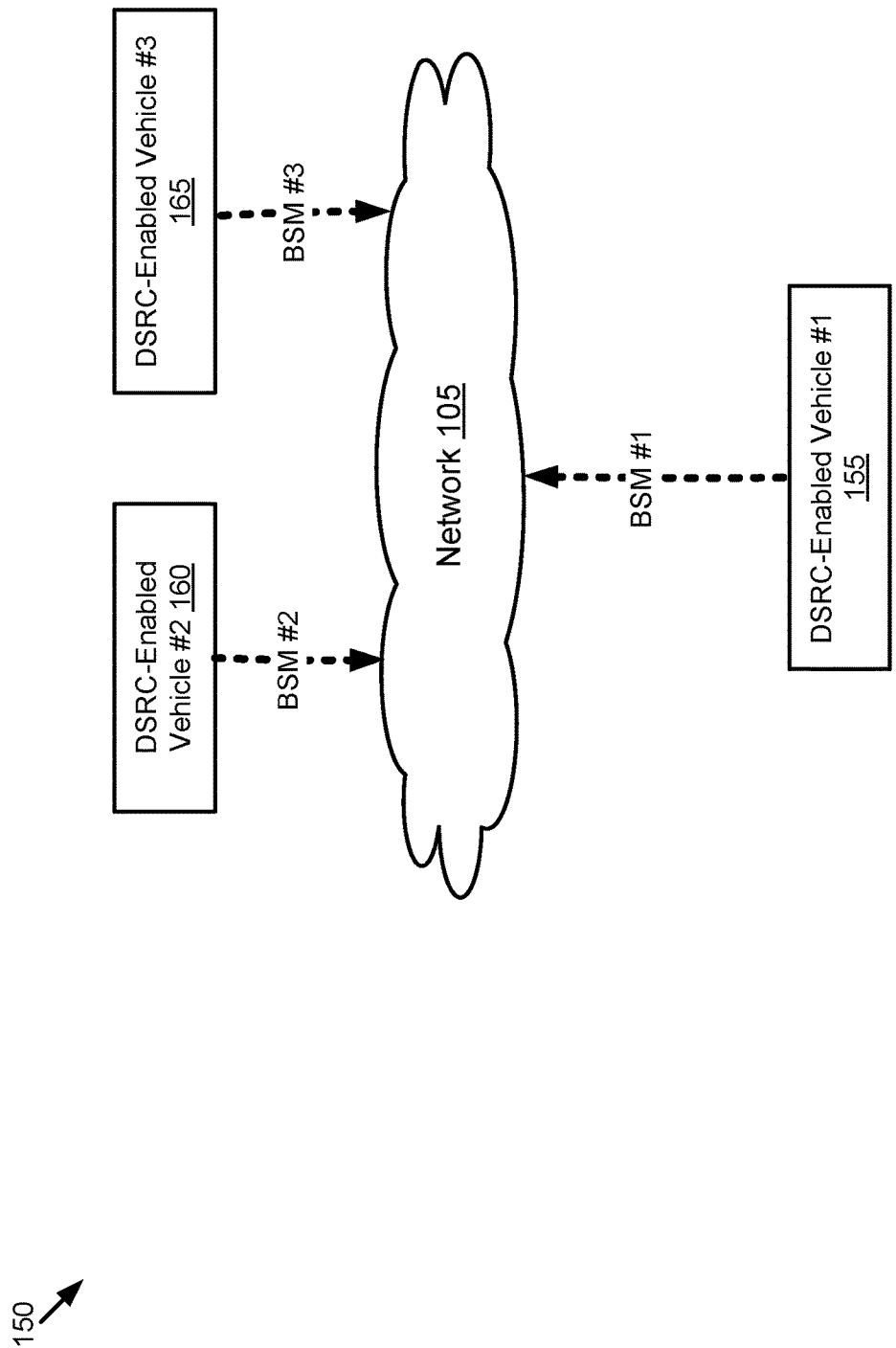
FIG. 1B is a block diagram illustrating an example use case of an operating environment for a radar interference management system according to some embodiments.

Referring now to FIG. 1B, depicted is a block diagram illustrating an example use case of an operating environment 150 for a radar interference management system according to some embodiments. In this example, there are three DSRC-enabled vehicles: DSRC-enabled vehicle #1 155, DSRC-enabled vehicle #2 160, and DSRC-enabled vehicle #3 165. Each of the DSRC-enabled vehicles includes a radar interference management system (not shown). The ego vehicle 123 in FIG. 1A may correspond to the DSRC-enabled vehicle #1 in FIG. 1B.

In this example, during a time frame, the DSRC-enabled vehicle #1 155 broadcasts BSM #1 via the network 105. The BSM #1 is received by the DSRC-enabled vehicle #2 160 and the DSRC-enabled vehicle #3 165. During the same time frame, the DSRC-enabled vehicle #2 broadcasts BSM #2 and the DSRC-enabled vehicle #3 broadcasts BSM #3, which are received by the other DSRC-enabled vehicles.

The radar interference management system in each of the DSRC-enabled vehicles builds a data structure that includes digital data describing the order in which the BSMs were received and broadcasted during the time frame. Specifically, the order is that the DSRC-enabled vehicle #1 broadcasted BSM #1, the DSRC-enabled vehicle #2 broadcasted BSM #2, and the DSRC-enabled vehicle #3 broadcasted BSM #3. Each of the radar interference management systems assign radar parameters based on the order. For example, each DSRC-enabled vehicle is assigned a different communication channel (e.g., a radar band, a frequency band, etc.) based on the order. In this example, the DSRC-enabled vehicle #1 is assigned a first communication channel, the DSRC-enabled vehicle #2 is assigned a second communication channel, and the DSRC-enabled vehicle #3 is assigned a third communication channel. The communication channel is used by each onboard radar system on each DSRC-enabled vehicle to function without radar interference with the onboard radar system of a neighboring DSRC-enabled vehicle.

Example Computer System

Figure 2:
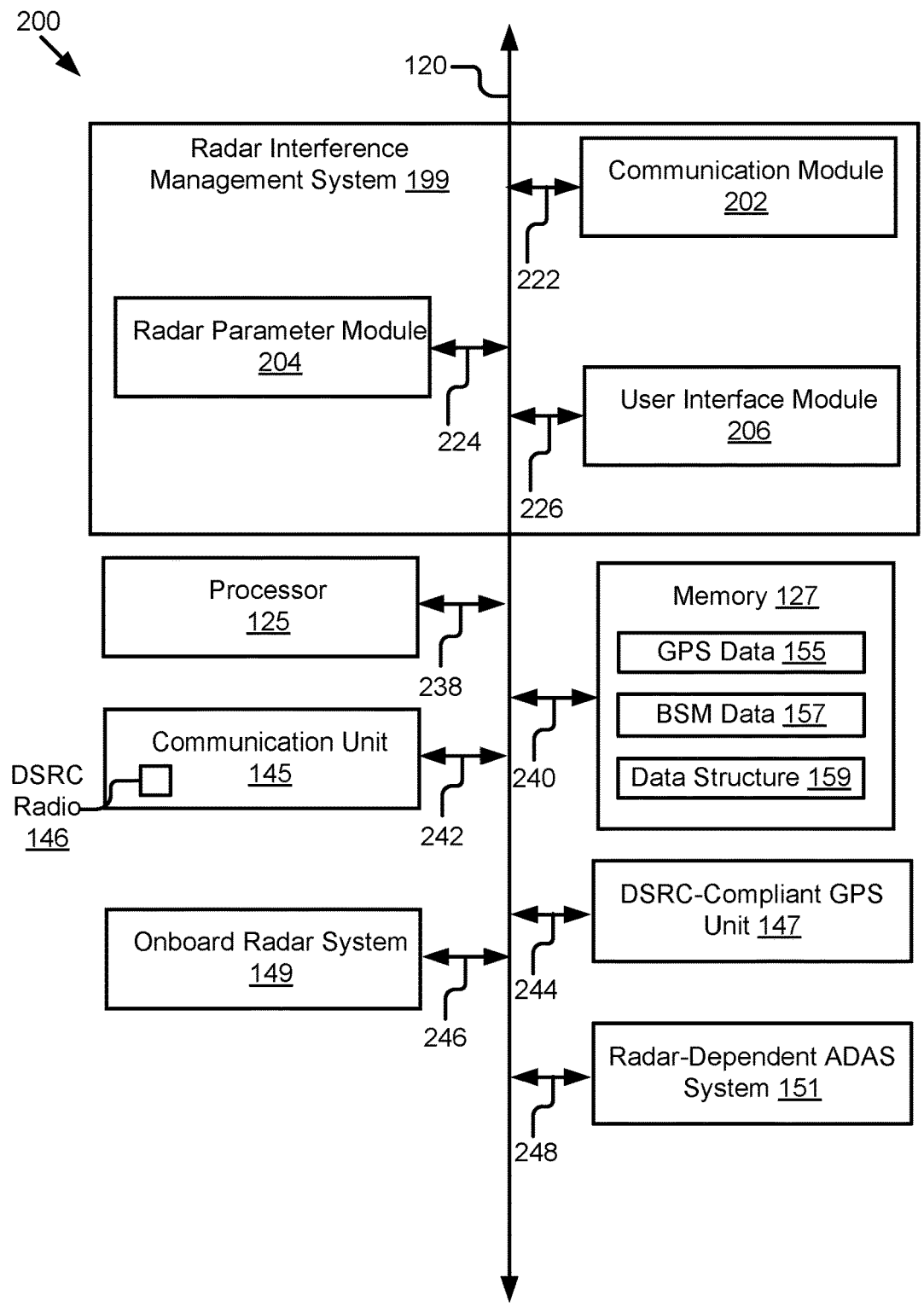
FIG. 2 is a block diagram illustrating an example computer system that includes a radar interference management system according to some embodiments.

Referring now to FIG. 2, depicted is a block diagram illustrating an example computer system 200 including the radar interference management system 199 of the ego vehicle 123 of FIG. 1A according to some embodiments.

In some embodiments, the computer system 200 may include a special-purpose computer system that is programmed to perform one or more steps of a method 700 described below with reference to FIG. 7.

In some embodiments, the computer system 200 is an onboard vehicle computer of the ego vehicle 123. In some embodiments, the computer system 200 is an onboard unit of the ego vehicle 123 of FIG. 1A. In some embodiments, the computer system 200 is an ECU, head unit or some other processor-based computing device of the ego vehicle 123 of FIG. 1A.

The computer system 200 may include one or more of the following elements according to some examples: the radar interference management system 199; the processor 125; the memory 127; the communication unit 145; the DSRC-compliant GPS unit 147; the onboard radar system 149; and the radar-dependent ADAS system 151. The components of the computer system 200 are communicatively coupled by a bus 120.

In the illustrated embodiment, the processor 125 is communicatively coupled to the bus 120 via signal line 238. The memory 127 is communicatively coupled to the bus 120 via signal line 240. The communication unit 145 is communicatively coupled to the bus 120 via signal line 242. The DSRC-compliant GPS unit 147 is communicatively coupled to the bus 120 via signal line 244. The onboard radar system 149 is communicatively coupled to the bus 120 via signal line 246. The radar-dependent ADAS system 151 is communicatively coupled to the bus 120 via signal line 248.

The following elements of the computer system 200 were described above with reference to FIG. 1, and so, those descriptions will not be repeated here: the processor 125; the memory 127; the communication unit 145; the DSRC-compliant GPS unit 147; the onboard radar system 149; and the radar-dependent ADAS system 151.

The memory 127 may store any of the data described above with reference to FIG. 1. The memory 127 may store any data needed for the computer system 200 to provide its functionality.

As illustrated, the memory 127 stores: the GPS data 155; the BSM data 157; and the data structure 159. The memory 127 may also store environment sensing information generated by the onboard radar system 149 and used by the radar-dependent ADAS system 151. These elements were described above with reference to FIG. 1A, and so, their descriptions will not be repeated here.

The onboard radar system 149 includes any hardware and software necessary measure the physical environment outside of the ego vehicle 123 of FIG. 1A. The onboard radar system 149 may include a sensor set of short-range sensors, long-range sensors, and other sensor systems. Turning to FIG. 3A, a block diagram is illustrated that depicts an example sensor set 300 that is used by the onboard radar system 149 of FIG. 1A according to some embodiments.

The example sensor set 300 performs environmental sensing using short-range sensors, long-range sensors, a rear vision system, a forward vision system, and an enhanced digital map system. The short-range sensors may be used to identify objects that are close to the ego vehicle 123, such as a trash can, a child, etc. The long-range sensors may be used to identify objects that are further away from the ego vehicle 123, such as other vehicles. The rear vision system may include a camera and be used to perform object detection and may have high frequency infrared capabilities. The rear vision system may be particularly susceptible to radar interference because high frequency communications have higher energy, which causes greater radar interference. The forward vision system may include a camera and be used to perform lane tracking and object detection. The enhanced digital map system may collect data from the sensor set and transmit it to a map server in the cloud, which collects similar data from other vehicles and uses the data to generate an enhanced digital map. The map server may also receive location data from a GPS satellite.

Figure 3B:
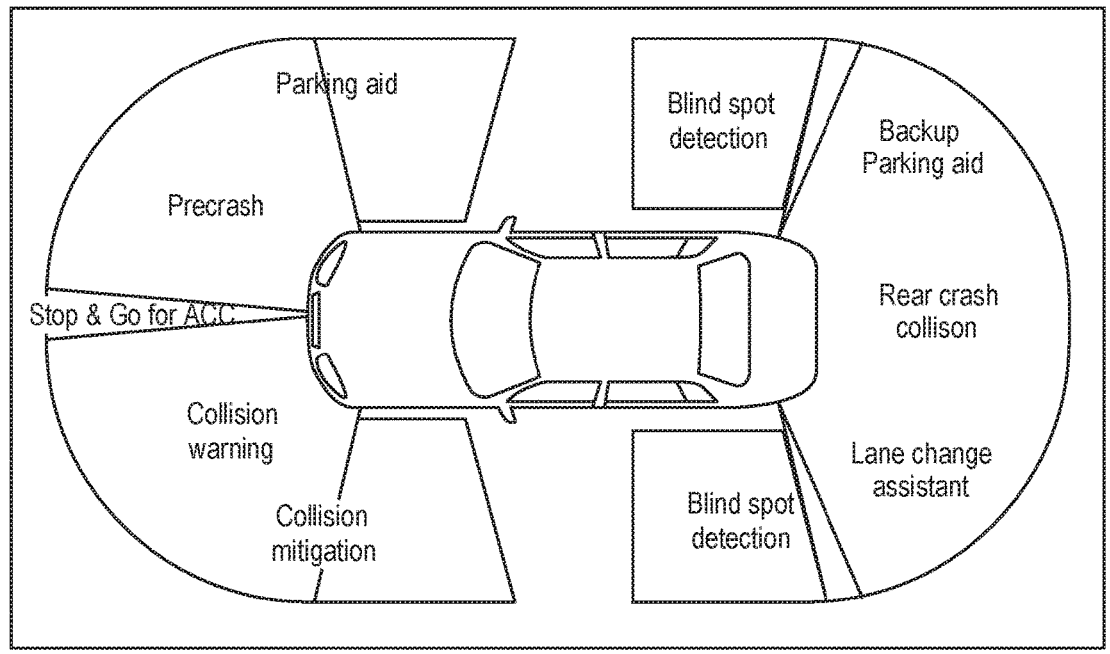
FIG. 3B is a block diagram illustrating example ADAS systems that are used by the radar-dependent ADAS system of FIG. 1A according to some embodiments.

The radar-dependent ADAS system 151 includes one or more ADAS systems that assist a driver in driving the vehicle. The ADAS systems rely heavily on the onboard radar system 149. A wide radar field-of-view is especially important for automated driving because radar-dependent ADAS system 151 needs to identify all objects that surround a vehicle. Turning now to FIG. 3B, a block diagram is depicted that illustrates examples ADAS systems 350 that are used by the radar-dependent ADAS system 151 of FIG. 1A according to some embodiments. In this example, the ADAS systems include blind spot detection, lane change assistance, rear crash collision avoidance, backup parking aid assistance, pre-crash assistance, stop and go for adaptive cruise control (ACC) assistance, collision warning assistance, and collision mitigation.

The different ADAS systems included in FIG. 3B help illustrate the level of complexity involved in a vehicle that is dependent on radar for using the different ADAS systems. Each of the sensors in the sensor set used by the onboard radar systems illustrated in FIG. 3A may use a different communication channel to function. When multiple vehicles are on a roadway at any given time and are clustered together while executing their respective onboard radar systems simultaneously, it results in radar interference because the different vehicles may be using the same communication channels.

Figure 4A:
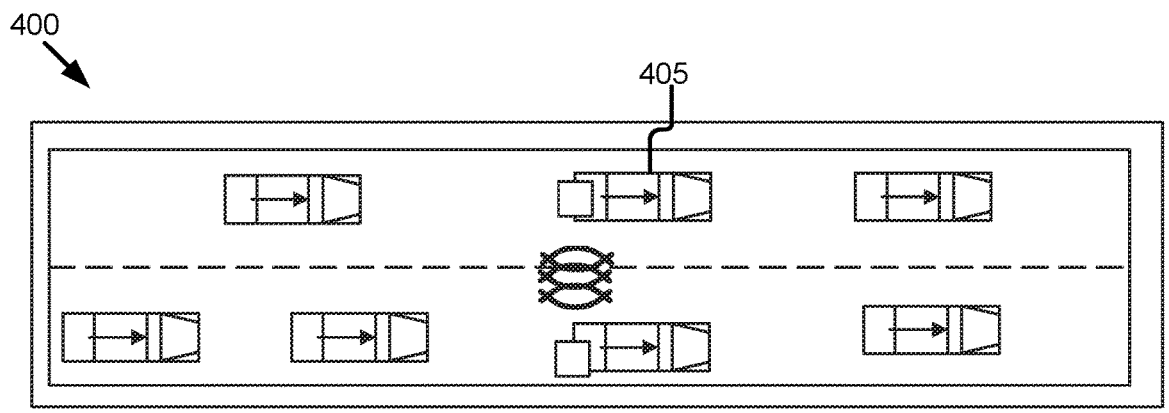
FIG. 4A is a block diagram illustrating direct interference caused by onboard radar systems of different vehicles that include radar-dependent ADAS systems on a two-lane roadway according to some embodiments.

FIG. 4A is a block diagram 400 illustrating direction interference caused by onboard radar systems of different vehicles that include radar-dependent ADAS systems on a two-lane roadway according to some embodiments. In this example, an ego vehicle 405 experiences radar interference from another vehicle in an opposing lane of the two-lane roadway.

Figure 4B:
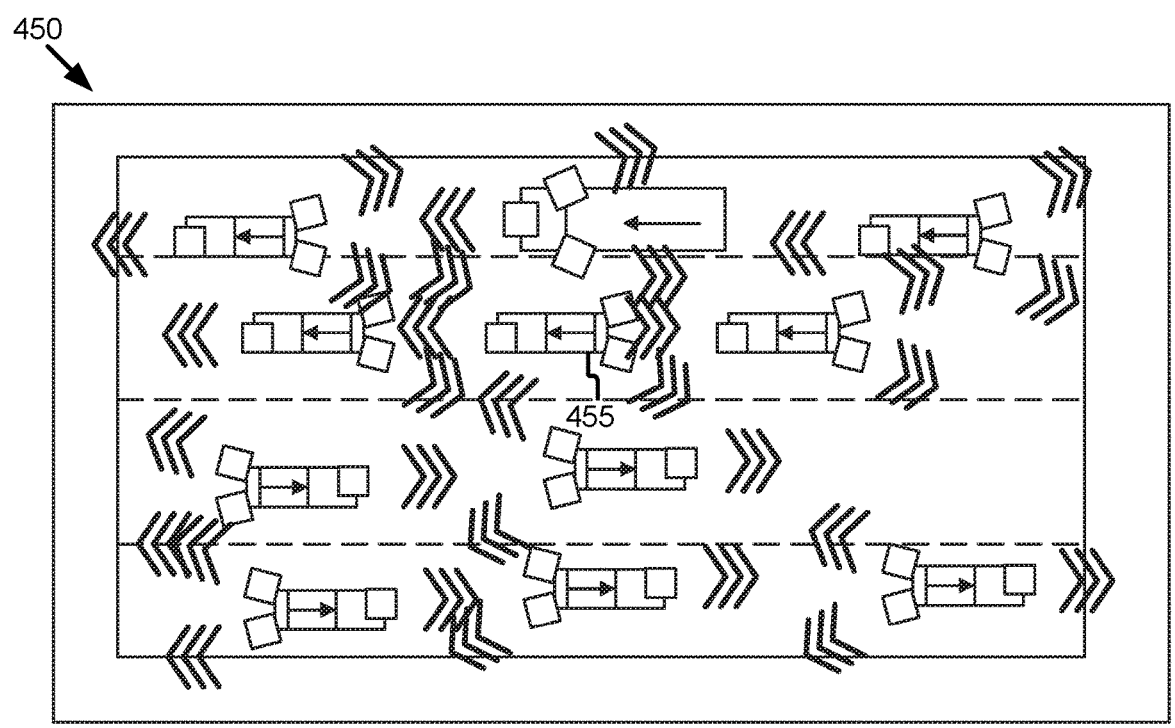
FIG. 4B is a block diagram illustrating mutual radar interference caused by onboard radar systems of different vehicles that include radar-dependent ADAS systems on a four-lane roadway according to some embodiments.

Turning to FIG. 4B, a block diagram 450 is illustrated that depicts mutual radar interference caused by onboard radar systems of different vehicles that include radar-dependent ADAS systems on a four-lane roadway according to some embodiments. This may be a common scenario in dense urban traffic. In this example, an ego vehicle 455 experiences radar interference from other vehicles that are in front, in back, or beside the ego vehicle 455. The ego vehicle 455 also experiences radar interference from other vehicles in an opposing lane of the four-lane roadway.

The mutual radar interference may cause the ADAS system of the ego vehicle 455 to identify a ghost target, which is a target that does not exist (i.e., a false positive) or decrease detection probability (i.e., fail to identify objects that do exist). Both ghost targets and decreased detection probability impair driving assistance and safety functionality.

The onboard radar systems 149 may identify non-existent objects or decrease detection of objects, thereby rendering the ADAS systems of the ego vehicle 123 to be nonfunctional or potentially dangerous. As a result, mutual radar interference impairs driving assistance and safety functionality.

The radar interference management system 199, as described in greater detail below, prevents radar interference from occurring by using radar parameters that the ego vehicle 123, the other DSRC-enabled vehicles 121A, and the nth DSRC-enabled vehicle 121N all use so that their respective radar-dependent ADAS systems can function without any radar interference caused by operating their respective onboard radar systems.

In the illustrated embodiment shown in FIG. 2, the radar interference management system 199 includes a communication module 202, a radar parameter module 204, and a user interface module 206.

The communication module 202 can be software including routines for handling communications between the radar interference management system 199 and other components of the computer system 200 or one or more of the operating environment 100 of FIG. 1A. In some embodiments, the communication module 202 can be a set of instructions executable by the processor 125 to provide the functionality described below for handling communications between the radar interference management system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100. For example, the communication module 202 receives or transmits, via the communication unit 145, BSMs to or from the other DSRC-enabled vehicle 121A and/or the nth DSRC-enabled vehicle 121N. The communication module 202 may send or receive any of the data described above with reference to FIG. 1A, or below with reference to FIGS. 6 and 7, via the communication unit 145.

In some embodiments, the communication module 202 receives data from components of the radar interference management system 199 and stores the data in the memory 127 (or a buffer or cache of the memory 127). For example, the communication module 202 receives GPS data 155 from the DSRC-compliant GPS unit 147 and stores the GPS data 155 in the memory 127 (or a buffer or cache of the memory 127).

In some embodiments, the communication module 202 may handle communications between components of the radar interference management system 199. For example, the communication module 202 transmits environmental sensing information from the onboard radar system 149 to the radar-dependent ADAS system 151.

The radar parameter module 204 can be software including routines for assigning radar parameters to the ego vehicle 123, the other DSRC-enabled vehicle 121A, and the nth DSRC-enabled vehicle 121N. In some embodiments, the radar parameter module 204 can be a set of instructions executable by the processor 125 which, when executed by the processor 125, cause the processor 125 to execute one or more of the steps of the method 700 described below with reference to FIG. 7. In some embodiments, the radar parameter module 204 can be stored in the memory 127 of the computer system 200 and can be accessible and executable by the processor 125. The radar parameter module 204 may be adapted for cooperation and communication with the processor 125 and other components of the computer system 200 via signal line 224.

The radar parameter module 204 may receive messages from the other DSRC-enabled vehicle 121A and the nth DSRC-enabled vehicle 121N that adhere to a vehicular-adapted wireless messaging protocol, such as BSMs or LTE-V2X. Although LTE-V2X may be used to minimize radar interference, the description below will focus on BSMs. Persons of ordinary skill in the art will recognize that any wireless communication protocol suitable for vehicular applications may be used instead of BSMs.

Because the range for DSRC is several hundred meters, this range creates a geographic region. Within the geographic region is a cluster of DSRC-equipped vehicles (e.g., the other DSRC-enabled vehicle 121A and the nth DSRC-enabled vehicle 121N of FIG. 1) that include one or more radar-dependent ADAS systems 151 as described above with reference to FIG. 1. Each of the ego vehicle 123, the other DSRC-enabled vehicle 121A, and the nth DSRC-enabled vehicle 121N broadcast a BSM at a regular interval (e.g., every 0.10 seconds). Because the BSMs are broadcasted, as opposed to being privately transmitted among vehicles, the radar interference management system 199 of each DSRC-equipped vehicle within the geographic region: (1) sees the BSMs and (2) knows the order in which the different BSMs were broadcast. As a result, the ego vehicle 123, the other DSRC-enabled vehicle 121A, and the nth DSRC-enabled vehicle 121N are located within a same geographic region that is limited to a broadcast range of the BSMs.

The radar parameter module 204 receives GPS data 155 from a GPS satellite. The radar parameter module 204 extracts time data from the GPS data 155 that describes the time as understood by the GPS satellite. The radar parameter module 204 establishes a default time frame value (e.g., 0.01 seconds). The default time frame value may be pre-programmed, modified by a user, etc. The radar parameter module 204 synchronizes its onboard computer time with the other DSRC-enabled vehicle 121A, and the nth DSRC-enabled vehicle 121N based on the time data that is part of the GPS data 155 received from the GPS satellite.

Figure 5:
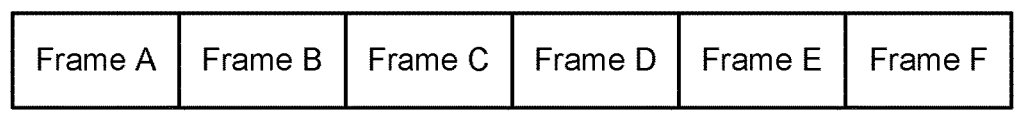
FIG. 5 is a block diagram illustrating example time frames that are synchronized among the DSRC-enabled vehicles based on GPS data according to some embodiments.

The radar parameter module 204 divides the time into time frames based on the time frame value. FIG. 5 is a block diagram 500 illustrating example time frames that are synchronized among the DSRC-enabled vehicles based on GPS-based time data according to some embodiments. If the time frame value is 0.01 seconds, then each frame depicted in FIG. 5 is 0.01 seconds long. In some embodiments, each time frame includes position information for the DSRC-enabled vehicle.

The other DSRC-enabled vehicle 121A and the nth DSRC-enabled vehicle 121N receive GPS data 155 with the same time data. The other DSRC-enabled vehicle 121A and the nth DSRC-enabled vehicle 121N share a synchronized time with the ego vehicle 123 and they divide time into the same time frames as the ego vehicle 123. As a result, all the DSRC-enabled vehicles have time frames with the same starting points and the same end points relative to one another.

The radar parameter module 204 observes, for a given time frame, when BSMs are broadcasted. The BSMs are broadcasted by the ego vehicle 123, the other DSRC-enabled vehicle 121A, and the nth DSRC-enabled vehicle 121N. The radar parameter module 204 observes the order in which the BSMs were broadcasted.

The radar parameter module 204 builds a data structure 159, such as a table, that includes digital data that describe the order in which the BSMs were received and broadcasted by the DSRC radio 146 during the given time frame. The other DSRC-enabled vehicle 121A and the nth DSRC-enabled vehicle 121N share a protocol with the ego vehicle 123 and receive the same BSMs. As a result, the other DSRC-enabled vehicle 121A and the nth DSRC-enabled vehicle 121N build the same data structure 159. The ego vehicle 123, the other DSRC-enabled vehicle 121A and the nth DSRC-enabled vehicle 121N also all include an onboard radar system 149.

The radar parameter module 204 assigns radar parameters to the ego vehicle 123, the other DSRC-enabled vehicle 121A, and the nth DSRC-enabled vehicle 121N based on the order described by the digital data included in the data structure 159. The radar system parameters may be used to identify topological changes based on the position information that may be included in the time frames. The radar parameter module 204 may also update the data structure 159 to include the radar parameters.

The protocol describes how the order is determined and the radar parameters are assigned so that the ego vehicle 123, the other DSRC-enabled vehicle 121A, and the nth DSRC-enabled vehicle 121N assign the same radar parameters without transmitting wireless messages to confirm the digital data with each other. During the time frame, the ego vehicle 123, the other DSRC-enabled vehicle 121A, and the nth DSRC-enabled vehicle 121N each execute their respective onboard radar systems based on the radar parameters, which are operable to control the execution of the onboard radar systems so that they minimize radar interference among the onboard radar systems of the ego vehicle 123, the other DSRC-enabled vehicle 121A, and the nth DSRC-enabled vehicle 121N. This way, the radar parameters are assigned to each DSRC-enabled vehicle in a distributed and non-centralized fashion.

Once a period of time for the given time frame expires, the radar parameter module 204 resets the radar parameters to null. The radar parameter module 204 observes a subsequent order in which the BSMs are received by the DSRC radio 146 of the ego vehicle 123 and broadcasted by the DSRC radio of the ego vehicle during a subsequent time frame. The radar parameter module 204 assigns the radar parameters to the ego vehicle 123, the other DSRC-enabled vehicle 121A, and the nth DSRC-enabled vehicle 121N based on the subsequent order described by the digital data included in the data structure 159.

For example, during an initial time frame, the ego vehicle 123 broadcasts a first BSM, the other DSRC-enabled vehicle 121A broadcasts a second BSM, and the nth DSRC-enabled vehicle 121N broadcasts a third BSM. The radar parameter module 204 assigns a first communication channel (e.g., a radar band, a frequency band, etc.) to the ego vehicle 123, a second communication channel to the other DSRC-enabled vehicle 121A, and a third communication channel to the nth DSRC-enabled vehicle 121N. After the initial time frame expires, the radar parameter module 204 sets the radar parameters to null. During a subsequent time frame, the other DSRC-enabled vehicle 121A broadcasts a first BSM, the ego vehicle 123 broadcasts a second BSM, and the nth DSRC-enabled vehicle 121N broadcasts a third BSM. The radar parameter module 204 assigns the first communication channel to the other DSRC-enabled vehicle 121A, the second communication channel to the ego vehicle 123, and the third communication channel to the nth DSRC-enabled vehicle 121N.

In some scenarios, there are more DSRC-enabled vehicles 121 than there are communication channels (e.g., a radar band, a frequency band, etc.) available. In some embodiments, the radar parameter module 204 uses position data, such as GPS coordinates, included in the BSMs sent by the DSRC-enabled vehicle 121 to determine the relative positions of the neighboring DSRC-enabled vehicles 121 in relation to an ego vehicle 123. For example, the radar parameter module 204 of the ego vehicle 123 determines that there are four DSRC-enabled vehicles 121 that are neighbors (i.e., four DSRC-enabled vehicles 121 that are right next to the ego vehicle 123). The radar parameter module 204 determines the communication channels assigned to the DSRC-enabled vehicles 121 and determines a communication channel for the ego vehicle 123 that is different from the DSRC-enabled vehicles 121 that are neighbors, where the communication channel for the ego vehicle 123 is the same as the communication channel assigned to a DSRC-enabled vehicle 121 that is possibly within transmission range, but is not a neighbor, i.e. is not right next to the ego vehicle 123.

Figure 6:
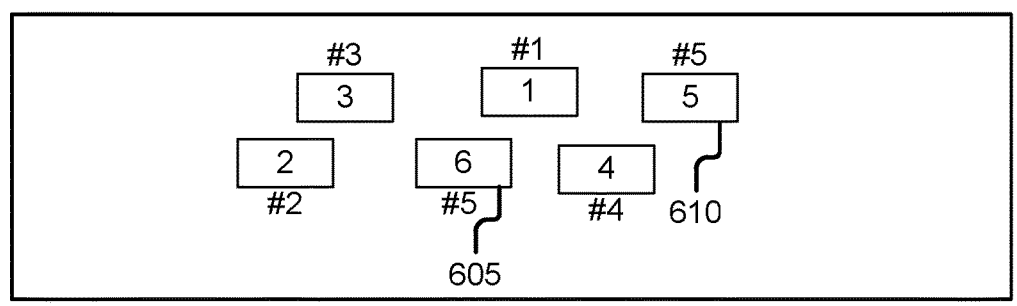
FIG. 6 is a block diagram illustrating example communication channel assignments where all available channels are reserved according to some embodiments.

For example, turning to FIG. 6 a block diagram 600 is illustrated that depicts example communication channel assignments where all available channels are reserved according to some embodiments. In this example, there are five communication channels available. The first five DSRC-enabled vehicles were assigned communication channels 1-5, respectively. The sixth DSRC-enabled vehicle 605 determines the location of the other DSRC-enabled vehicles based on the BSMs. The sixth DSRC-enabled vehicle 605 assigns itself communication channel #5 because the DSRC-enabled vehicle's 605 immediate neighbors were assigned different communication channels. Specifically, the immediate neighbors were assigned communication channels 1-4 and communication channel #5 was assigned to a fifth DSRC-enabled vehicle 610 that is far enough away from the sixth DSRC-enabled vehicle 605 that the radar interference will be minimized. A similar approach may be used on a time-division based or a code-division based operation.

In some embodiments, the radar parameter module 204 detects packet collisions, which are more likely to occur in dense traffic situations. In some embodiments, the radar parameter module 204 is compatible with carrier sense multiple access (CSMA). CSMA is a media access control (MAC) protocol that is used to verify the absence of other traffic on a shared transmission medium before data is transmitted on the shared transmission medium. CSMA may use collision detection or collision avoidance to reduce packet collisions that result from two DSRC-enabled vehicles 121 transmitting on the shared transmission medium at the same time.

A CSMA-based protocol, such as DSRC, could suffer packet collisions in dense traffic. For example, if two DSRC-enabled vehicles 121 choose the same backoff, when the two DSRC-enabled vehicles 121 send a respective packet, the two packets could collide. In this scenario, neighboring DSRC-enabled vehicles 121 may set their radar parameters to treat the two DSRC-enabled vehicles 121 as if they did not transmit BSMs. The two DSRC-enabled vehicles 121 may determine that their packets collided by noticing that the packet from the other DSRC-enabled vehicle 121 is longer than the usual period (e.g., 100 ms) from the start of the frame. Once the radar parameter module 204 determines that the ego vehicle 123 is experiencing packet collision with an other DSRC-enabled vehicle 121A, the radar parameter module 204 can broadcast a second BSM and assign the radar parameters based on the order the BSMs are sent. For example, the radar parameter module 204 may determine that an initial time frame expired, set the radar parameters to null, observe a subsequent order in which the BSMs are received and broadcasted, and assign the radar parameters based on the subsequent order.

The user interface module 206 can be software including routines for generating graphical data for displaying a user interface. In some embodiments, the user interface module 206 can be stored in the memory 127 of the computer system 200 and can be accessible and executable by the processor 125. The user interface module 206 may be adapted for cooperation and communication with the processor 125 and other components of the computer system 200 via signal line 226.

In some embodiments, the user interface module 206 generates graphical data for displaying a user interface for a user, such as a driver of the ego vehicle 123. The user interface module 206 may generate graphical data for displaying a user interface that provides the user with options for configuring aspects of the radar interference management system 199. For example, the user interface may include an option for changing the default setting of parameters for the time frame value from 0.01 seconds to a different value.

Example Method

Referring now to FIG. 7, depicted is a method 700 for minimizing radar interference according to some embodiments. One or more of the steps described herein for the method 700 may be executed by the radar interference management system 199 of FIG. 1A and/or the computer system 200 of FIG. 2.

At step 702, for a time frame, an order in which BSMs are received by a DSRC radio 146 of an ego vehicle 123 and broadcasted by the DSRC radio of the ego vehicle 123 is observed. The BSMs are transmitted by one or more other DSRC-enabled vehicles 121A that share a protocol with the ego vehicle so that the one or more other DSRC-enabled vehicles 121A and the ego vehicle 123 obey the protocol. The ego vehicle 123 and the one or more other DSRC-enabled vehicles 121A each include an onboard radar system 149.

At step 704, a data structure 159 that includes digital data that describes the order in which the DSRC messages were received and broadcasted by the DSRC radio during the time frame is built.

At step 706, an onboard computer of the ego vehicle 123 assigns radar parameters to the one or more other DSRC-enabled vehicles 121A and the ego vehicle 123 based on the order described in the digital data included in the data structure 159. The protocol describes how the order is determined and the radar parameters are assigned so that the ego vehicle and the one or more other DSRC-enabled vehicles assign same radar parameters without transmitting wireless messages to confirm the digital data with each other. The ego vehicle 123 and the one or more DSRC-enabled vehicle 121A, during the time frame, each execute their respective onboard radar systems based on the radar parameters that are operable to control the execution of the respective onboard radar systems so that they minimize radar interference among the respective onboard radar systems of the ego vehicle 123 and the one or more other DSRC-enabled vehicles 121A.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for minimizing radar interference, the method implemented by an onboard vehicle computer of an ego vehicle, the method comprising:
observing, for a time frame, an order in which Basic Safety Messages ("BSMs") are received by a radio of the ego vehicle and broadcasted by the radio of the ego vehicle, wherein the BSMs are transmitted by one or more other vehicles that share a protocol with the ego vehicle so that the one or more other vehicles and the ego vehicle obey the protocol;
building a data structure that includes digital data that describes the order in which the BSMs were received and transmitted by the radio during the time frame; and
assigning radar parameters to the one or more other vehicles and the ego vehicle based on the order described by the digital data included in the data structure, wherein the protocol describes how the order is determined and the radar parameters are assigned so that the ego vehicle and the one or more other vehicles assign same radar parameters without transmitting wireless messages to confirm the digital data with each other.

2. The method of claim 1, wherein the ego vehicle and the one or more other vehicles, during the time frame, each include an onboard radar system and they each execute their respective onboard radar systems based on the radar parameters, which are operable to control an execution of the respective onboard radar systems so that they minimize radar interference among the respective onboard radar systems of the ego vehicle and the one or more other vehicles.

3. The method of claim 1, further comprising updating the data structure to include the radar parameters.

4. The method of claim 1, wherein the ego vehicle and the other vehicles are located within a same geographic region that is limited to a broadcast range of the BSMs.

5. The method of claim 1, wherein the BSMs are broadcast at a bandwidth between 5.850 and 5.925 gigahertz.

6. The method of claim 1, wherein the order is an initial order, the time frame is an initial time frame, and further comprising:
responsive to a period of time for the initial time frame expiring, setting the radar parameters to null;
observing a subsequent order in which the BSMs are received by the radio of the ego vehicle and broadcasted by the radio of the ego vehicle during a subsequent time frame;
updating the digital data in the data structure to include the subsequent order in which the BSMs were received and broadcasted by the radio; and
assigning the radar parameters to the one or more other vehicles and the ego vehicle based on the subsequent order described by the digital data included in the data structure.

7. The method of claim 6, wherein the radar parameters include communication channels and assigning the radar parameters to the one or more other vehicles and the ego vehicle is further based on:
determining that the communication channels have been assigned to the one or more other vehicles;
determining a position of each of the one or more other vehicles based on position data included in the BSMs; and
assigning a communication channel from the communication channels to the ego vehicle that is different from the communication channels that are assigned to the one or more other vehicles that are positioned next to the ego vehicle.

8. The method of claim 1, wherein the ego vehicle and the one or more other vehicles each include a corresponding advanced driver assistance system.

9. The method of claim 1, wherein the ego vehicle and the one or more other vehicles share a synchronized time that is based on data received from a global positioning system satellite.

10. The method of claim 1, wherein the ego vehicle and the one or more other vehicles chose a same backoff channel, the order is an initial order, the time frame is an initial time frame, and further comprising:
determining, by the ego vehicle, that a packet from the one or more other vehicles is longer than expected;
responsive to a period of time for the initial time frame expiring, setting the radar parameters to null;
observing a subsequent order in which the BSMs are received by the of the ego vehicle and broadcasted by the of the ego vehicle during a subsequent time frame; and
assigning the radar parameters to the one or more other vehicles and the ego vehicle based on the subsequent order.

11. A system comprising:
an onboard vehicle computer system of an ego vehicle and that includes a non-transitory memory storing computer code which, when executed by the onboard vehicle computer system causes the onboard vehicle computer system to:
observe, for a time frame, an order in which Basic Safety Messages ("BSMs") are received by a radio of the ego vehicle and broadcasted by the radio of the ego vehicle, wherein the BSMs are transmitted by one or more other vehicles that share a protocol with the ego vehicle so that the one or more other vehicles and the ego vehicle obey the protocol;
build a data structure that includes digital data that describes the order in which the BSMs were received and transmitted by the radio during the time frame; and
assign radar parameters to the one or more other vehicles and the ego vehicle based on the order described by the digital data included in the data structure, wherein the protocol describes how the order is determined and the radar parameters are assigned so that the ego vehicle and the one or more other vehicles assign same radar parameters without transmitting wireless messages to confirm the digital data with each other.

12. The system of claim 11, wherein the ego vehicle and the one or more other vehicles, during the time frame, each include an onboard radar system and they each execute their respective onboard radar systems based on the radar parameters which are operable to control execution of the respective onboard radar systems so that they minimize radar interference among the respective onboard radar systems of the ego vehicle and the one or more other vehicles.

13. The system of claim 11, wherein the computer code further causes the onboard vehicle computer system to update the data structure to include the radar parameters.

14. The system of claim 11, wherein the ego vehicle and the vehicles are located within a same geographic region that is limited to a broadcast range of the BSMs.

15. The system of claim 11, wherein the order is an initial order, the time frame is an initial time frame, and the computer code further causes the onboard vehicle computer system to:
  responsive to a period of time for the initial time frame expiring, set the radar parameters to null;
  observe a subsequent order in which the BSMs are received by the radio of the ego vehicle and broadcasted by the radio of the ego vehicle during a subsequent time frame;
  update the digital data in the data structure to include the subsequent order in which the BSMs were received and broadcasted by the radio; and
  assign the radar parameters to the one or more other vehicles and the ego vehicle based on the subsequent order described by the digital data included in the data structure.

16. A non-transitory memory encoded with a computer program, the computer program comprising instructions that, when executed by one or more processors, cause the one or more processors to perform operations comprising:
  observing, for a time frame, an order in which Basic Safety Messages ("BSMs") are received by a radio of an ego vehicle and broadcasted by the radio of the ego vehicle, wherein the BSMs are transmitted by one or more other vehicles that share a protocol with the ego vehicle so that the one or more other vehicles and the ego vehicle obey the protocol;
  building a data structure that includes digital data that describes the order in which the BSMs were received and transmitted by the radio during the time frame; and
  assigning radar parameters to the one or more other vehicles and the ego vehicle based on the order described by the digital data included in the data structure, wherein the protocol describes how the order is determined and the radar parameters are assigned so that the ego vehicle and the one or more other vehicles assign same radar parameters without transmitting wireless messages to confirm the digital data with each other.

17. The non-transitory memory of claim 16, wherein the ego vehicle and the one or more other vehicles, during the time frame, each include an onboard radar system and they each execute their respective onboard radar systems based on the radar parameters which are operable to control execution of the respective onboard radar systems so that they minimize radar interference among the respective onboard radar systems of the ego vehicle and the one or more other vehicles.

18. The non-transitory memory of claim 16, further comprising additional instructions stored on the non-transitory memory which, when executed by the one or more processors causes the one or more processors to execute additional operations comprising updating the data structure to include the radar parameters.

19. The non-transitory memory of claim 16, wherein the ego vehicle and the other vehicles are located within a same geographic region that is limited to a broadcast range of the BSMs.

20. The non-transitory memory of claim 16, wherein the order is an initial order and the time frame is an initial time frame, and further comprising additional instructions stored on the non-transitory memory which, when executed by the one or more processors causes the one or more processors to execute additional operations comprising:
  responsive to a period of time for the initial time frame expiring, setting the radar parameters to null;
  observing a subsequent order in which the BSMs are received by the radio of the ego vehicle and broadcasted by the radio of the ego vehicle during a subsequent time frame;
  updating the digital data in the data structure to include the subsequent order in which the BSMs were received and broadcasted by the radio; and
  assigning the radar parameters to the one or more other vehicles and the ego vehicle based on the subsequent order described by the digital data included in the data structure.

* * * * *